United States Patent Office 2,898,255
Patented Aug. 4, 1959

2,898,255

SOLDERING FLUX COMPOSITION

John J. Thompson, Kingston, and Arthur P. Knight, West Hurley, N.Y., assignors to International Business Machines Corporation, New York, N.Y., a corporation of New York No Drawing. Application June 30, 1958
Serial No. 745,260

4 Claims. (Cl. 148—23)

This invention relates to an improved soldering flux, and more particularly, to a non-corrosive rosin flux which exhibits effective oxide removal from the base metal and good flow characteristics.

The function of a soldering flux is to remove oxide contamination from a metal to provide a clean surface during the application of the solder. While a number of chemical substances may be used effectively for this purpose, as for example, zinc chloride or hydrochloric acid, these acidic materials are also quite corrosive to the metal itself. For this reason, rosin fluxes have been used extensively which, although less acidic in character, do not afford as good fluxing action. Certain organic modifying agents, therefore, have been incorporated into these fluxes to increase the acidic content. However, these fluxes often have the undesirable property of producing toxic decomposition products at the soldering temperature.

An object of this invention, therefore, is to provide a modified rosin flux which exhibits superior oxide removal.

A further object is to formulate a soldering flux which is non-corrosive and odorless during actual soldering operation.

Another object is to formulate a soldering flux which has good flow or capillary action.

Still another object is to produce a soldering flux which is not detrimental to the dielectric properties of the base materials.

Among the other objects is to provide a soldering flux which does not splatter during soldering action.

Other objects of the invention will be pointed out in the following description and claims which disclose, by way of example, the principle of the invention and the best mode, which has been contemplated, of applying that principle.

The flux composition of the present invention comprises essentially a mixture of rosin and a combination of (1) a low molecular weight saturated mono-carboxylic aliphatic acid and (2) a saturated dicarboxylic aliphatic acid. The flux is formulated by mixing the components at room temperature and stirring until an intimate mixture is obtained. The preferred embodiment of the invention comprises mixing water-white rosin, 80 grams by weight; isopropyl alcohol, 65 grams by weight; formic acid, 8 grams by weight; and glutaric acid, 1.5 grams by weight. Since formic acid has a boiling point of 212.5° F., rosin, a melting point of 248° F., and glutaric acid, a boiling point of 392° F., these acids provide a step by step deoxidation of the oxide surface in which the rosin continues to protect the deoxidized surface until the soldering action is completed. The formic acid component may constitute from 3–50% by weight of the flux composition, although 5.5% is preferable. The glutaric acid portion of the flux may vary up to 13.5%; however, 1% is deemed sufficient to prevent splatter during soldering.

The soldering flux composition of the present invention combines the attributes of non-corrosive action with effective oxide removal, a minimum of splatter during soldering, and the absence of noxious or toxic odors from the decomposition products of the organic constituents.

In application, the flux composition described herein may be used to particular advantage in dip soldering of copper plated apertures in printed circuit boards. In such a process it is quite important that the flux flow readily through the aperture and wet the entire metallic area around the hole when the boards are dipped in the flux bath. The flux composition described herein has been found to flow more effectively in such an operation than other commercially available modified rosin base soldering fluxes. Printed circuit boards prepared using the fluxing material of this invention show a much higher insulation resistance and a lower incidence of shorting out between conductors because of solder splatter than boards prepared using a wide variety of other flux materials.

While the saturated aliphatic monocarboxylic acid has been illustrated by reference to formic acid, other similar analogues of this acid, such as acetic acid and propionic acid may be used. Similarly, oxalic acid, malonic acid, succinic acid and adipic acid may be substituted for glutaric acid in formulating the flux composition.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A soldering flux consisting essentially of a mixture of rosin, 3–5% by weight of a low molecular weight saturated monocarboxylic aliphatic acid, and 1–13.5% by weight of a saturated aliphatic dicarboxylic acid.

2. A soldering flux consisting essentially of a mixture of rosin, 3–5% by weight of a low molecular weight saturated monocarboxylic aliphatic acid selected from the group consisting of formic acid, acetic acid and propionic acid; and 1–13.5% by weight of a saturated aliphatic dicarboxylic acid selected from the group consisting of oxalic, malonic, succinic, glutaric and adipic acids.

3. A soldering flux consisting of a mixture of rosin, 3–50% by weight of formic acid, and 1–13.5% by weight of glutaric acid.

4. A soldering flux consisting essentially of a mixture of rosin, 5.5% by weight of formic acid, and 1% by weight of glutaric acid.

References Cited in the file of this patent

UNITED STATES PATENTS

| 1,208,799 | Kriews | Dec. 19, 1916 |
| 2,474,863 | Rinkenbach | July 5, 1949 |